Sept. 20, 1932. J. R. REPLOGLE 1,878,181

LID FOR REFRIGERATED CABINETS

Filed Feb. 5, 1927 2 Sheets-Sheet 1

INVENTOR
John R. Replogle
BY
Wayne M. Hart
ATTORNEY.

Sept. 20, 1932.    J. R. REPLOGLE    1,878,181
LID FOR REFRIGERATED CABINETS
Filed Feb. 5, 1927    2 Sheets-Sheet 2

PROPRIETOR.
John R. Replogle
BY
Wayne M. Hart
ATTORNEY.

Patented Sept. 20, 1932

1,878,181

UNITED STATES PATENT OFFICE

JOHN R. REPLOGLE, OF DETROIT, MICHIGAN, ASSIGNOR TO KELVINATOR CORPORATION, OF DETROIT, MICHIGAN, A CORPORATION OF MICHIGAN

LID FOR REFRIGERATED CABINETS

Application filed February 5, 1927. Serial No. 166,052.

This invention relates to cabinets, and more particularly to lids for refrigerated food storage cabinets.

An object of my invention is to provide a removable hinged lid structure which is associated with a food storage cabinet in a manner such that there can be no movement of the lid section intended to be in closed position when another lid section is moved to allow access to the food storage chamber.

Another object of my invention is to provide an insulated, sanitary lid structure, for closing an opening leading to the storage space in a refrigerated cabinet, which comprises a minimum number of parts which can be readily assembled and economically manufactured.

Still another object of my invention is to provide an insulated lid structure, for closing an opening leading to the storage space in a refrigerated cabinet, which includes a base formed of cast material which will withstand blows and the action of the moisture, and changes of temperature without becoming deformed, thus insuring a seating contact which will not admit warm air into the storage space.

These and other objects will be more apparent as the description progresses, in which like characters refer to like parts in the drawings illustrating a preferred embodiment of the invention.

Figure 1:
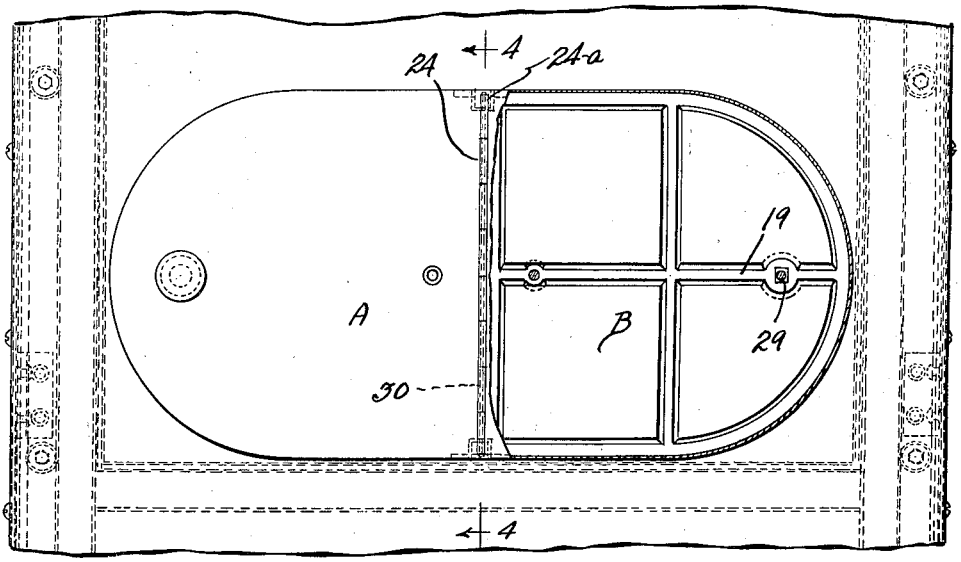
Fig. 1 is a partial top plan view of a mechanically refrigerated cabinet, parts being broken away to show the interior construction of the lid.
Figure 2:
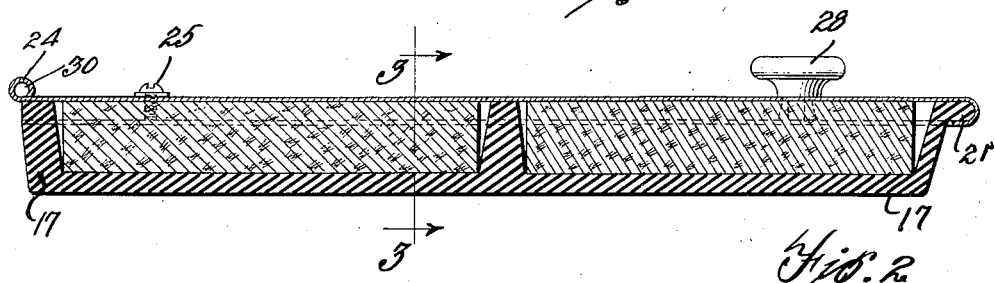
Fig. 2 is a vertical section through one of the hinge sections of the lid taken substantially on the line 2—2 of Fig. 3.
Figure 3:
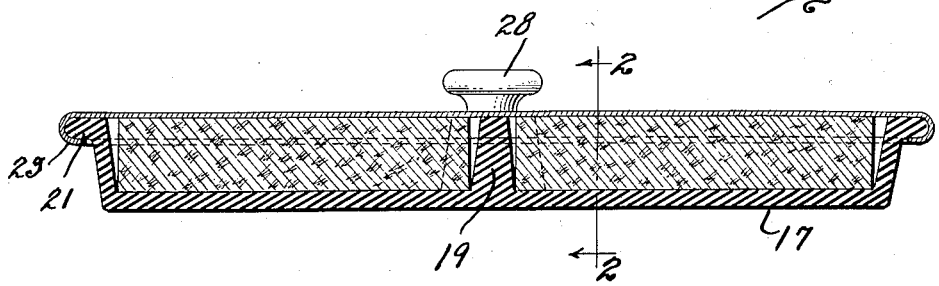
Fig. 3 is a vertical section through the lid, taken at right angles to Fig. 2, substantially on the line 3—3 of Fig. 2.

My improved form of lid is especially adapted for use with mechanically refrigerated cabinets for storing ice cream, soft drinks and the like. Food storage chambers in cabinets of this character were at first constructed of open-topped cylindrical sleeves extending downwardly within the cabinet, the opening in the top cabinet wall being closed by a removable circular lid. It is now the practice to provide some cabinets with larger food storage chambers, these chambers preferably extending the full width of the cabinet to receive either two ice cream cans, or package or bottled goods. Removable sectional lids have been used for closing the entrance to these larger food storage chambers, these lid sections being hinged together so that either hinged section may be raised when removing or inserting foods within the storage chamber. With hinged lid structures covering an elongated opening, it is found that when one section is raised the whole structure often is moved laterally so that when the raised section is lowered it does not fit over the opening, and the lid structure must necessarily be properly positioned again so that it will tightly close the entrance opening to the food chamber. The trade has found that this continual adjusting of the lid with respect to the opening in the cabinet is annoying, and quite often the lid is left partly open, which permits warm air to enter the interior of the food chamber.

The improved lid construction hereinafter described is formed particularly for association with refrigerated cabinets, having large elongated food chamber openings. These cabinets are constructed with side walls 10 and top wall 11, which are enclosed by a sheet metal casing 12, the interior face of the walls 10 having a metal lining 13 and the space within the cabinet containing large elongated sheet metal receptacles providing food storage chambers 14. The top wall of the cabinet is provided with openings 15 directly above the open upper ends of the food storage chambers.

Figure 5:
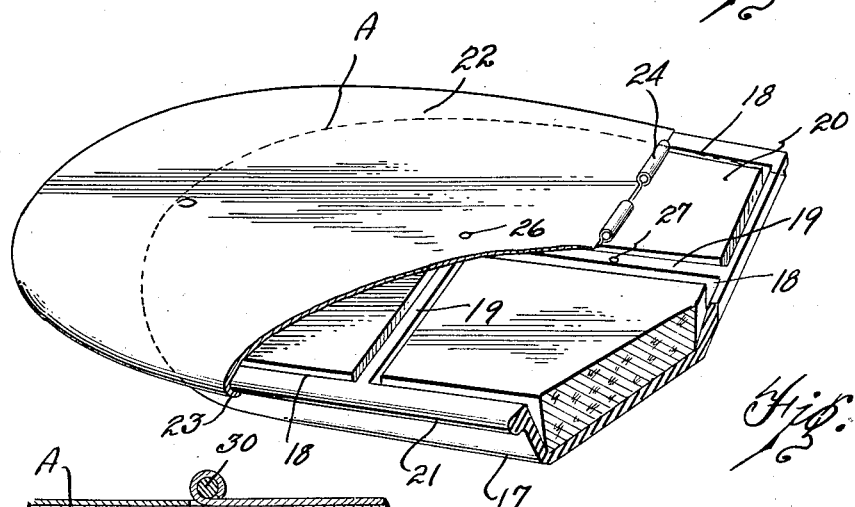
Fig. 5 is a perspective view of one of the hinged sections of the lid, parts being broken away and the cover plate being moved back from its assembled relation with the base to show the insulating material in position.
Figure 6:
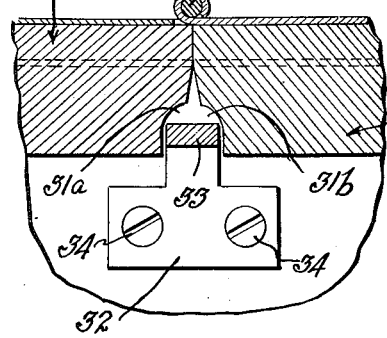
Fig. 6 is a detailed sectional view taken on the line 6—6 of Fig. 4.

Closure members, or lid structures 16 are utilized for closing these openings, and each lid structure is preferably constructed of two sections A and B, hinged together at their abutting ends so that either section may be raised to uncover a portion of the opening in the cabinet to permit access to the interior of the food storage chamber. The lid structure sections are substantially identical in construction, and a description of one of the sections will be sufficient. Each lid section includes a hollow base or frame member 17 which is formed of composition rubber molded to provide a bottom wall from the periphery of which an upstanding wall and interior ribs 19 extend. The ribs 19 reinforce the base member and divide the interior thereof into separated pockets 18 in which are inserted cork board sections 20, or other similar insulating material. The upper end of the peripheral wall of the base member, on three sides thereof, is formed to extend laterally as a semi-circular flange 21, the bottom surface of which extends beyond the opening in the top of the cabinet over which the lid sections are associated. A relatively thin outer shell or cover 22, preferably formed of "monel" metal, extends across the top of the base and the edges 23 are bent to fit substantially around the flanges 21 of the base. Fig. 5 shows this cover partially slipped into assembled position and being moved in the direction indicated by the arrow. One edge of this cover being provided with the hinge sockets 24 and when this cover is pushed all the way on a screw 25 is inserted through the hole 26 in the cover and engages in the tapped hole 27 located preferably in one of the central transverse ribs 19. Similarly, the handle 28 is secured into the bushing 29 molded within the inner lining, and when this handle and screw are screwed down, the cover 22 is securely locked to the base confining the corkboard insulation within each pocket. The adjacent lid section is provided with hinged sockets 24—a which mate with the hinged sockets 24, and the hinge pin 30 is passed through these sockets to hinge the two lid sections together.

I preferably construct the inner lining of a hard rubber composition which is very readily molded and will have a very smooth surface when withdrawn from the molds. This smooth surface provides a seat that may be very easily cleaned, and because of the construction of the lining there are no joints that will be exposed to the interior of the food storage chamber, and any dirt or condensation from the foods that tends to collect on the inside face of the lid may be easily wiped off with a cloth and thus the lid may be easily maintained in a sanitary condition, which is quite essential for the efficient preservation of foods which are arranged to be stored within the food storage chambers. The base, furthermore, is not affected by moisture, by cold or heat, or by blows and retains its original form when subjected to these various conditions.

Figure 4:
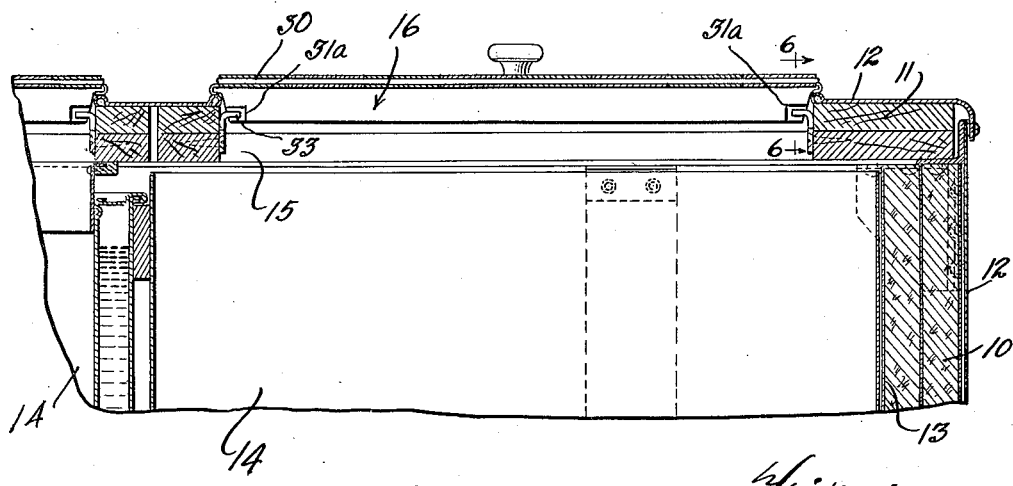
Fig. 4 is a sectional view through the lid assembled to the cabinet, taken substantially on the line 4—4 of Fig. 1.

In order to prevent the lid from moving laterally on its seat when one of the lid sections is raised I provide a very simple means for maintaining the lid in position, so that when the raised lid section is lowered it will return to its original position over the opening in the cabinet. Adjacent the abutting edges of each lid section A and B, I provide the recesses 31—a and 31—b, respectively, which extend for only a short way in from the side edges, as shown in Fig. 4. The brackets 32 provided with the laterally extended ears 33 are secured to opposite sides of the opening by the screws 34, or other suitable fastening devices. One of these brackets is secured to each side of the opening 15 at the middle point, and the laterally extending ears 33 are arranged to nicely fit within the recesses 31—a and 31—b of both lid sections. When either one of these lid sections is raised the other lid section which remains seated on its seat is prevented from moving or slipping on its seat by these ears 33 which extend within the sockets and engage the base. When the raised lid section is thus lowered it will always seat and prevent any excess amount of warm air from entering the food chamber due to improper fitting of the lid on its seat.

Various changes can be made in the structure without departing from the spirit of my invention and the scope of the appended claims.

What I claim is:

1. A lid structure, for closing an opening leading to the food storage chamber in a refrigerated cabinet, comprising a non-deformable hollow base element formed of a molded rubber composition, said base including a bottom wall terminating in a laterally flanged peripheral wall, and a sheet metal cover extending across said flange, said cover being detachably secured to said base element.

2. A lid structure, for closing an opening leading to the food storage chamber in a refrigerated cabinet, comprising a base element formed of a non-corrosive molded composition, said base element including a bottom wall and a peripheral wall terminating in a laterally extending flange, a detachable self retaining sheet metal top cover extending across said flange in a parallel spaced relation with said bottom wall and extending partially around the exterior of said flange, and heat insulating material intermediate the wall and said base element and said cover.

3. A lid structure, for closing an opening leading to the food storage chamber in a refrigerated cabinet, comprising a non-deformable molded base element, including a bottom wall terminating in a laterally flanged peripheral wall, a sheet metal cover extending across and enclosing the flange of said peripheral wall, insulating material intermediate said base element and said cover, and a knob exterior of said cover and attached to said base element.

4. A lid structure, for closing an opening leading to the food storage chamber in a refrigerated cabinet, comprising a non-deformable base element including a transversely extending wall terminating in an upstanding laterally flanged wall, a removable sheet metal covering enclosing the flanged end of said wall, insulating material intermediate said cover and said transversely extending wall, and removable means for securing said cover to said base element.

5. A lid structure, for closing an opening leading to the food storage chamber in a refrigerated cabinet, comprising a base element including a bottom wall and a flange upstanding wall, a sheet metal cover extending across the flanged end of said upstanding wall, an edge portion of said cover being bent to engage the flanged portion of said wall, said cover being slidable endwise relative to said base element, and removable means for securing said cover to said base element.

6. A lid structure, for closing an opening leading to the food storage chamber in a refrigerated cabinet, comprising a non-deformable base element including a bottom wall and an upstanding peripheral wall terminating in a rounded flange, a sheet metal cover extending across the flanged portion of said wall and bent to engage the rounded flange and means for securing said cover to said base element.

7. A lid structure, for closing an opening leading to the food storage chamber in a refrigerated cabinet, comprising a non-deformable molded base element including a bottom wall terminating in an exterior wall and having interior ribs extending therefrom forming pockets, an insulating material within the said pockets in said base element, a sheet metal cover extending across the open end of said base element and enclosing the insulating material in said pockets, and means for securing said cover to said base element, said cover tightly retaining said insulating material against said base element.

8. A lid structure, for closing an opening leading to the food storage chamber in a refrigerated cabinet, comprising a pair of lid sections, each section comprising a base provided with a laterally projecting flange at two sides and one end thereof, said cover structure being detachable laterally from said base sections and an outer cover for each lid section having two sides one end provided with turned in edges forming a continuous groove engaging over the flanges on said base, the other end of said cover being provided with curled hinge sockets arranged to match with the corresponding hinge sockets on the cover of the other lid section, a hinge pin threaded through said hinge sockets to hinge the lid sections together, and means for securing each cover and associated base together.

In testimony whereof, I hereunto affix my signature.

JOHN R. REPLOGLE.

CERTIFICATE OF CORRECTION.

Patent No. 1,878,181.  September 20, 1932.

JOHN R. REPLOGLE.

It is hereby certified that error appears in the printed specification of the above numbered patent requiring correction as follows: Page 3, line 17, claim 4, for "covering" read "cover"; line 65, claim 8, strike out the word "and", and line 65, after the word "sides" insert the word "and"; and that the said Letters Patent should be read with these corrections therein that the same may conform to the record of the case in the Patent Office.

Signed and sealed this 13th day of December, A. D. 1932.

(Seal)

M. J. Moore,
Acting Commissioner of Patents.